(12) United States Patent
Oros

(10) Patent No.: US 8,915,039 B1
(45) Date of Patent: Dec. 23, 2014

(54) SOLID-WOOD RIGID BLOCK ASSEMBLIES

(71) Applicant: Vasile C. Oros, Menlo Park, CA (US)

(72) Inventor: Vasile C. Oros, Menlo Park, CA (US)

( * ) Notice: Subject to any disclaimer, the term of this patent is extended or adjusted under 35 U.S.C. 154(b) by 0 days.

(21) Appl. No.: 13/910,984

(22) Filed: Jun. 5, 2013

(51) Int. Cl.
*E04F 15/04* (2006.01)
*E06B 3/74* (2006.01)
*B27M 1/08* (2006.01)
*F16B 3/00* (2006.01)

(52) U.S. Cl.
CPC .. *E06B 3/74* (2013.01); *B27M 1/08* (2013.01); *F16B 3/00* (2013.01)
USPC .......................... 52/586.2; 52/590.1; 52/586.1

(58) Field of Classification Search
CPC ................ E04B 2002/0232; E04B 2002/0234; E04B 2002/0236; E04B 2002/0239; E04B 2002/0241
USPC ............................ 52/590.1, 568, 586.1, 586.5
See application file for complete search history.

(56) References Cited

U.S. PATENT DOCUMENTS

| | | | | |
|---|---|---|---|---|
| 707,444 | A * | 8/1902 | Moses | 52/279 |
| D36,546 | S * | 9/1903 | Commins | D5/61 |
| 2,104,307 | A * | 1/1938 | Miller | 144/354 |
| 2,717,420 | A * | 9/1955 | Roy | 264/119 |
| 4,603,717 | A | 8/1986 | Thomas | |
| 4,630,420 | A * | 12/1986 | Hagemeyer | 52/313 |
| 4,716,700 | A * | 1/1988 | Hagemeyer | 52/456 |
| 5,002,105 | A | 3/1991 | Bodig | |
| 5,881,511 | A * | 3/1999 | Keller, Jr. | 52/220.2 |
| 6,025,053 | A | 2/2000 | Grenier | |
| 6,125,607 | A | 10/2000 | Poce | |
| 6,217,976 | B1 * | 4/2001 | Macpherson et al. | 428/106 |
| 6,533,005 | B2 | 3/2003 | Hill | |
| 6,534,143 | B1 | 3/2003 | Thoma | |
| 7,137,232 | B2 * | 11/2006 | Lynch et al. | 52/784.1 |
| 8,424,261 | B2 * | 4/2013 | Collier et al. | 52/309.12 |
| 8,662,120 | B2 * | 3/2014 | Riviere et al. | 144/347 |
| 2001/0017186 | A1 * | 8/2001 | MacPherson et al. | 156/298 |
| 2002/0134041 | A1 * | 9/2002 | Lofstrom | 52/590.1 |
| 2004/0139673 | A1 * | 7/2004 | Luetgert et al. | 52/313 |
| 2010/0212258 | A1 * | 8/2010 | Wysock et al. | 52/784.1 |
| 2012/0258330 | A1 * | 10/2012 | Wysock et al. | 428/600 |
| 2013/0081347 | A1 * | 4/2013 | Dewar et al. | 52/588.1 |

OTHER PUBLICATIONS

Beasley, "Built to Last," Gentry Home, 18 Media Gentry Magazines, p. 14-16, San Francisco, the Peninsula and Silicon Valley, CA; Jul. / Aug. 2013.
Fixler, Gary, "002: a rolling base for my planer #7: parallel sliding dovetail drawer slides, part I", pp. 1-14, downloaded from http://web.archive.org/web/20101031192416/http://lumberjocks.com/gfixler/blog/13478; archive.org indicates the document was available online on Oct. 31, 2010.

* cited by examiner

*Primary Examiner* — Andrew J Triggs
(74) *Attorney, Agent, or Firm* — Law Office of Andrei D Popovici, PC

(57) ABSTRACT

In some embodiments, a durable solid-wood door or other rigid block assembly includes two generally-planar, mutually-parallel solid-wood boards each having a plurality of mutually-parallel dovetail-connection channels running generally along an internal surface of each of the boards, and a solid-wood central keying structure disposed between the two solid-wood boards. The central keying structure includes a plurality of two-sided sliding dovetails keys sized to slide within the dovetail-connection channels to secure the two-mutually-parallel solid-wood boards to each other via sliding dovetail connections to the central keying structure. Alternating wood grain orientations may be used to reduce warping. Each board may include multiple laterally-adjacent monolithic slabs interconnected via tongue-and-groove edge connections, with the dovetail connection channels extending across multiple slabs. An adhesive and/or fasteners secure the two boards in a fixed position relative to each other, creating a solid block structure.

9 Claims, 6 Drawing Sheets

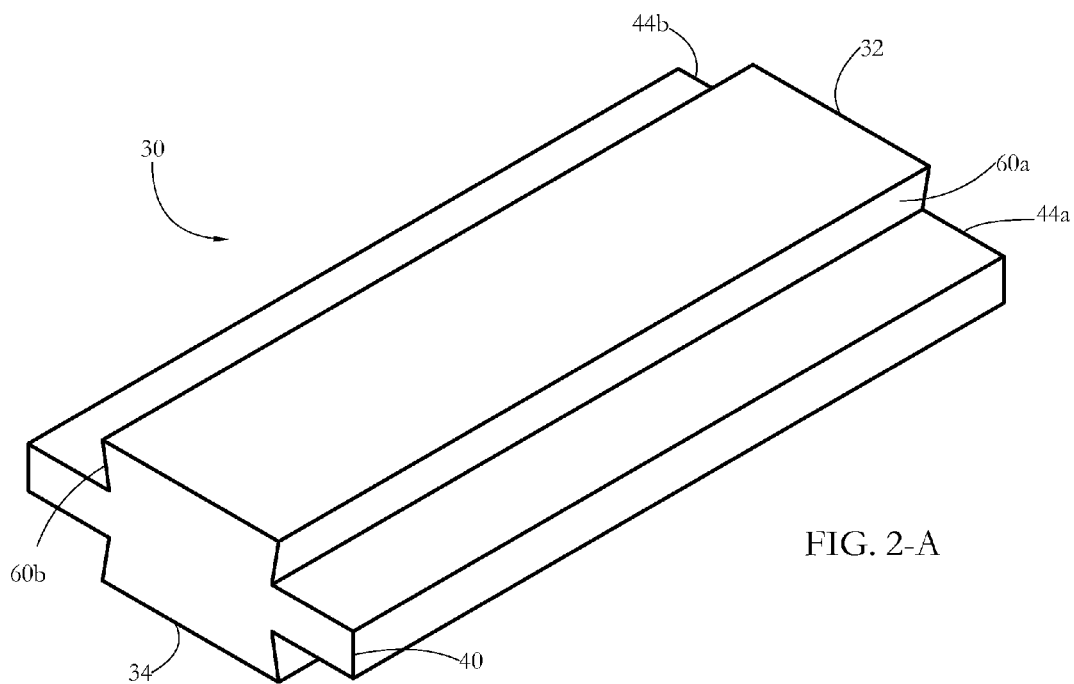
FIG. 2-A
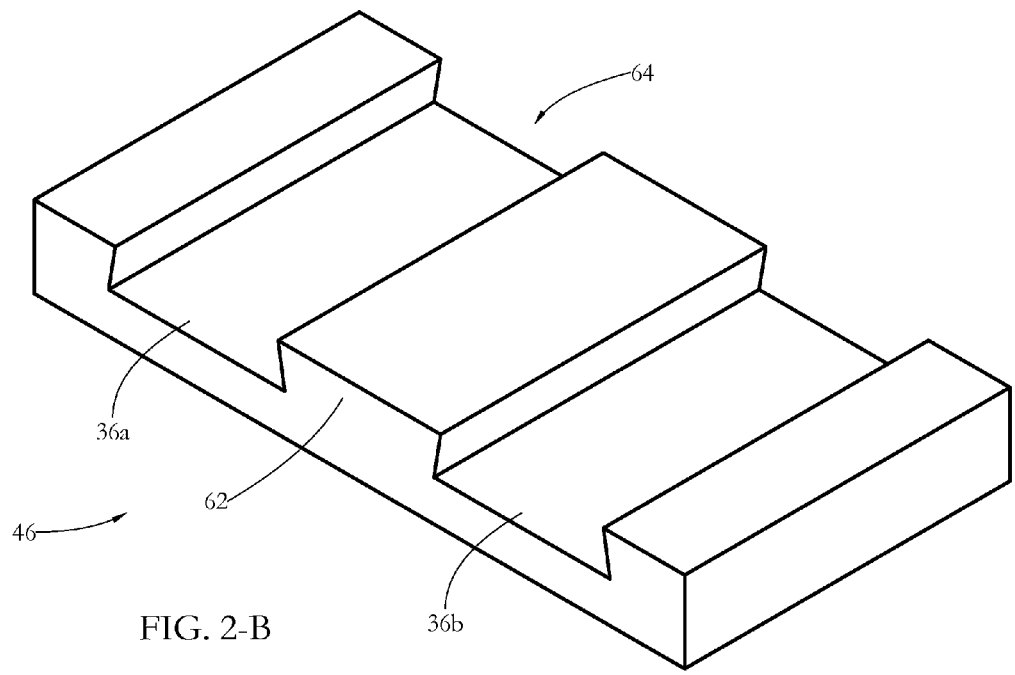
FIG. 2-B

_US 8,915,039 B1_

SOLID-WOOD RIGID BLOCK ASSEMBLIES

BACKGROUND OF THE INVENTION

This invention relates to woodworking, and in particular to solid-wood rigid block structures suitable for forming doors, door jambs, table-tops and other rigid block structures.

Engineered wood products such as plywood are manufactured by binding together wood strands, fibers or veneers with adhesive to form a composite material. Engineered wood products may exhibit inferior reliability and durability, but are relatively easy to manufacture. Engineered wood is increasingly commonly used to make doors, furniture, and other wood products.

Solid-wood products are made from cut solid lumber. Solid-wood products are generally relatively robust and durable, and have a distinctive look which is desirable for certain applications. At the same time, solid-wood products are generally expensive and difficult to manufacture, and may exhibit significant changes in volume in the presence of temperature and humidity variations.

SUMMARY OF THE INVENTION

According to one aspect, a solid-wood rigid block assembly comprises: two generally-planar, mutually parallel solid-wood boards each having a plurality of mutually-parallel dovetail-connection channels running generally along an internal major surface of each of the boards, each board including a plurality of laterally-adjacent, monolithic solid-wood slabs, each dovetail-connection channel extending across an interface between adjacent slabs; and a solid-wood central keying structure disposed between the two mutually-parallel solid-wood boards, the central keying structure comprising a plurality of two-sided sliding dovetails keys sized to slide within the dovetail-connection channels and to extend across interfaces between adjacent slabs to secure the two-mutually-parallel solid-wood boards to each other via sliding dovetail connections to the central keying structure.

According to another aspect, a solid-wood assembly comprises a first generally-planar solid-wood board; and a second generally-planar solid-wood board generally-parallel to the first solid-wood board. The first solid-wood board and the second solid-wood board are rigidly interlocked via a plurality of sliding dovetail connections established by a plurality of sliding dovetail keys sized to slide within a corresponding plurality of sliding dovetail channels defined in the first and second solid-wood board. The first and second solid-wood boards are secured in a fixed position relative to each other using an adhesive and/or a set of fasteners affixed to the first and second solid-wood boards to form a rigid block structure.

According to another aspect, a method of making a solid-wood assembly comprises machining, using a computer numerical control (CNC) machine, a plurality of sliding dovetail channels along at least one major surface of two generally-planar solid-wood boards; sliding a plurality of sliding dovetail keys through the plurality of sliding dovetail channels to interlock the two solid-wood boards to each other in a mutually-parallel relationship; and affixing the two interlocked solid-wood boards in a fixed position relative to each other using an adhesive and/or a set of fixed fasteners affixed to the two solid-wood boards to form a rigid block structure.

BRIEF DESCRIPTION OF THE DRAWINGS

The foregoing aspects and advantages of the present invention will become better understood upon reading the following detailed description and upon reference to the drawings where:

FIG. 2-A shows an isometric view of a solid-wood sliding dovetail key of the assembly of FIG. 1, according to some embodiments of the present invention.

FIG. 2-B shows an isometric view of a generally-planar solid-wood slab of the assembly of FIG. 1, the slab having sliding dovetail channels defined along an internal surface of the slab, according to some embodiments of the present invention.

DETAILED DESCRIPTION OF THE INVENTION

The following description illustrates the present invention by way of example and not necessarily by way of limitation. A set of elements includes one or more elements. A plurality of elements includes two or more elements. Any recitation of an element is understood to refer to at least one element. Unless otherwise required, any described method steps need not be necessarily performed in a particular illustrated order. The term "solid wood" refers to ordinary lumber, whether having any hollow spaces or not, but does not include engineered wood; engineered wood products (e.g. plywood) are manufactured by binding together wood strands, fibers or veneers with adhesives to form a composite material. The terms "monolithic" and "integrally formed" refer to structures cut from a single original piece of wood, and not structures created by assembly (whether by gluing, interlocking, fastening, or any other assembly/connection mechanism). The statement that two boards are secured in a fixed position relative to each other means that the two boards are not user-removable from each other during the normal operation of the assembly; such securing does not exclude removing the boards from each other by disassembly (e.g. unscrewing) or destruction of the assembly. Unless otherwise specified, the term "longitudinal" refers to a major direction of a planar structure; for example, for a rectangular door whose major dimension is its height, the longitudinal direction is the vertical direction. The statement that two generally-planar structures are stacked means that the structures are in contact along corresponding major surfaces of the structures. The statement that two generally-planar structures are laterally-adjacent means that the two structures are in contact along corresponding minor surfaces (lateral surfaces/edges) of the structures.

Figure 1:
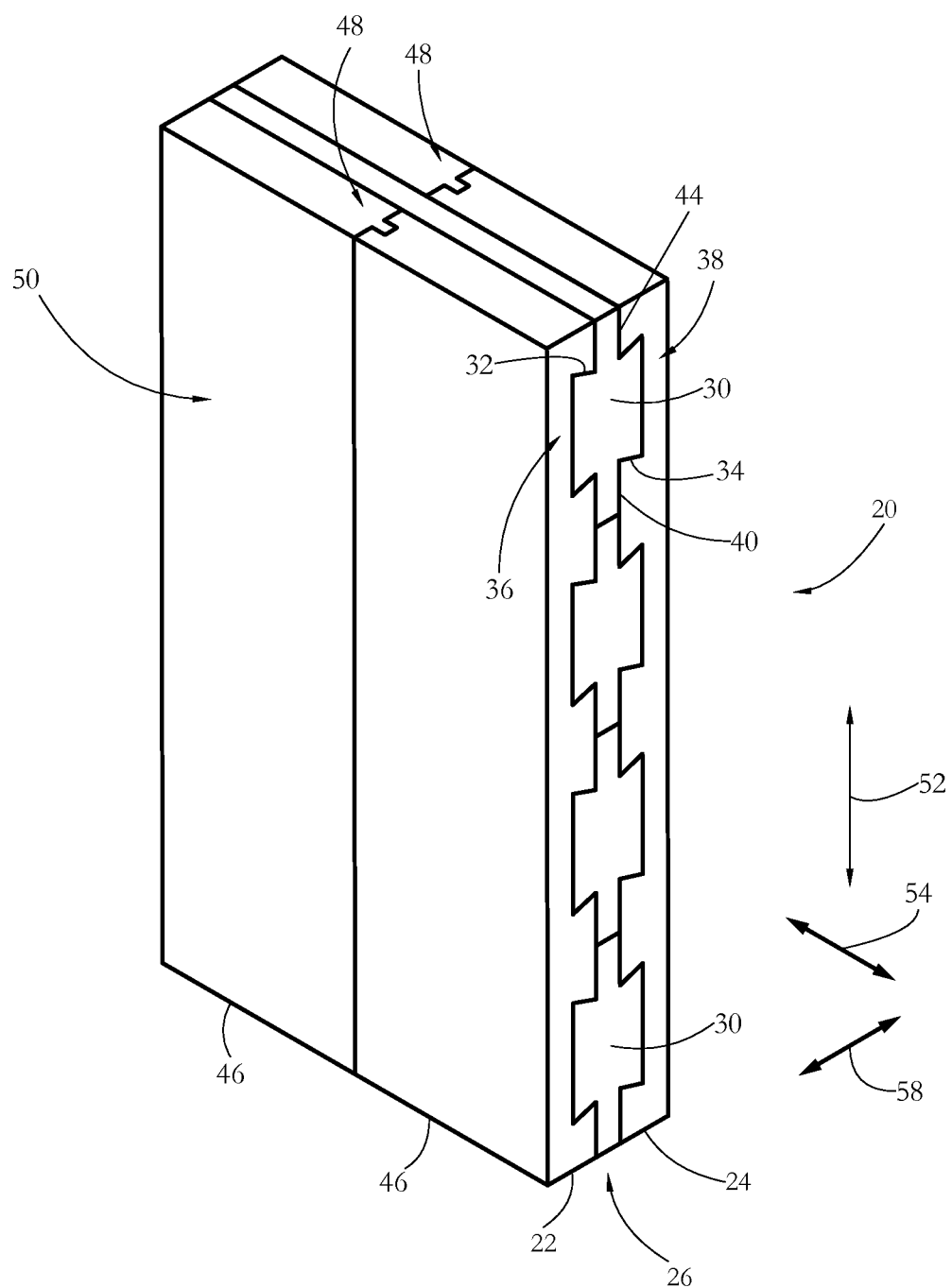
FIG. 1 shows an isometric view of a generally-planar, rigid block solid-wood assembly according to some embodiments of the present invention.

FIG. 1 shows an exemplary generally-planar rigid block solid-wood assembly 20 according to some embodiments of the present invention. Assembly 20 may form all or part of the body of a door, door jamb, table, or other rigid block wood structure. Assembly 20 has a major surface 50 defined by a length (longitudinal) direction 52 and a width direction 54. A thickness direction 58 is generally orthogonal to the plane of major surface 50. Assembly 20 includes two mutually-parallel, planar solid-wood boards (panels) 22, 24, and a generally-longitudinal keying structure 26 disposed between and interconnecting boards 22, 24. Keying structure 26 is formed by a plurality of bi-directional dovetail keys 30 stacked along a longitudinal direction. Each dovetail key 30 includes a pair of oppositely-facing trapezoidal tails 32, 34, which are sized to slide through corresponding transverse channels 36, 38 defined along internal surfaces of boards 22, 24. An adhesive such as glue suitable for securing wood is situated along channels 36, 38 to secure boards 22, 24 in a fixed position relative to each other. In some embodiments, a set of fixed fasteners (e.g. wood or metal nails and/or screws) may be used to secure boards 22, 24 in a fixed position relative to each other.

In some embodiments, each board 22, 24 is formed by a monolithic solid wood slab. In some embodiments, each board 22, 24 may be formed by a plurality of generally-longitudinal, planar, laterally-adjacent monolithic solid-wood slabs 46, as shown in FIG. 1. Adjacent slabs 46 are interconnected via tongue-and-groove connections 48 defined along a lateral side (edge) of slabs 46. A linear tongue protrudes from one edge of a slab 46, and fits within a matching linear groove of the neighboring slab 46. A particular slab 46 may have a protruding tongue on one edge and a matching groove on the opposite edge, allowing such tongue-and-groove connections to be concatenated.

FIG. 2-A shows an isometric view of a solid-wood two-sided sliding dovetail key 30 according to some embodiments of the present invention. Key 30 may be formed from a single monolithic solid-wood piece. Key 30 has two oppositely-facing tails 32, 34 defined on opposite sides of a central slab 40. Central slab 40 include two extensions (supports) 44a-b extending away on opposite sides of a central section defined by tails 32, 34. Tail 32 has a trapezoidal cross-section in a plane perpendicular to the major surface of assembly 20. Two inwardly-sloping dovetail-connection surfaces 60a-b are defined on opposite sides of tail 32.

FIG. 2-B shows an isometric view of a solid-wood slab 46 according to some embodiments of the present invention. Slab 46 has a plurality of mutually-parallel sliding dovetail channels 36a-b defined along an internal surface 64 of slab 46. A set of channel-separation protrusions 62 separate channels 36a-b. A channel separation protrusion 62 may extend over two lateral extensions 44 (see FIG. 2-A) belonging to two adjacent dovetail keys 30.

Figure 3:
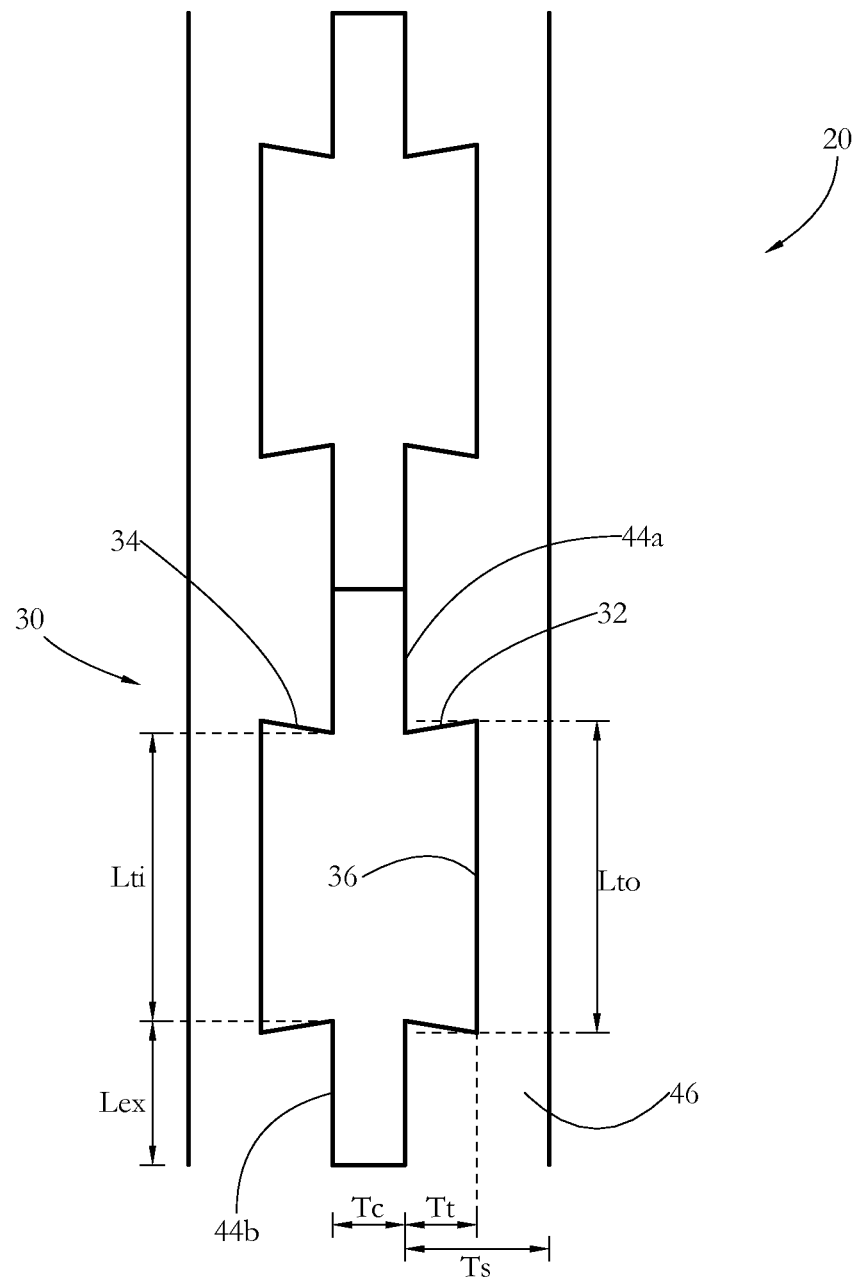
FIG. 3 shows a side view of the assembly of FIG. 1 according to some embodiments of the present invention.

FIG. 3 shows a side view of assembly 20 illustrating a set of exemplary dimensions according to some embodiments of the present invention. As FIG. 3 illustrates, an outer tail length $L_{to}$ is slighter larger than an inner tail length $L_{ti}$ of tails 32, 34. A length $L_{ex}$ represents the length of central slab extensions 44a-b. The thicknesses $T_c$ and $T_t$ represent the thicknesses of central slab 40 and tails 32, 34, respectively. A thickness $T_s$ represents a total thickness of solid-wood slab 46 outside of sliding dovetail channels 36. The depth of sliding dovetail channels 36 channels is equal to the thickness of tails 32, 34.

In some embodiments, the inner and outer tail lengths $L_{ti}$ and $L_{to}$ have values between about 1 and 5 cm, for example between 1" (1 inch) and 2", and are different by a value between 1-10 mm, for example between 1/16" and 1/2". In some embodiments, the extension length is about half the length(s) $L_{ti}$ and/or $L_{to}$, or half the average of the two tail lengths, so that tails 32-34 have a length of roughly half that of dovetail key 30. In an exemplary embodiment, the lengths $L_{ti}$ and $L_{to}$ have values of 1 3/8" and 1 5/8", respectively, while the total length of dovetail key 30 is 3".

In some embodiments, the central slab and dovetail thicknesses $t_c$ and $T_t$ have values between 0.5 cm and 2 cm, for example between 1/4" and 1/2", while the total slab thickness value $T_s$ has a value about equal to the sum of $t_c$ and $T_t$. In an exemplary embodiment, the central slab and dovetail thicknesses $T_c$ and $T_t$ have a value of 3/8", while the while the total slab thickness value $T_s$ has a value of 3/4". In some embodiments, the dovetail angle has a value between 7° and 18°, for example between 9° and 14°.

In some embodiments, various dimensions as described above may be chosen as follows. First, the thickness of assembly 20 is chosen according to the desired application (e.g. door, tabletop, etc.). The thicknesses of keying structure 26 and external boards 22, 24 are then chosen accordingly. The thickness of keying structure 26 may be chosen to be greater than that of external boards 22, 24. A tail length, channel depth and corresponding tail height are then chosen, along with a dovetail angle (e.g. 7, 9 or 14°). Choosing a tail length L equal to twice the tail extension length $L_{ex}$ simplifies a machining process performed using a CNC machine by allowing the same CNC settings to be used for making both dovetail keys and cutting corresponding dovetail channels.

In some embodiments, panels 22, 24, and keying structure 26 are made from the same type of solid wood. The wood may be selected from any number of hard woods such as oak or maple, or softwoods such as pine, redwood or cedar. In preferred embodiments, panels 22, 24, and keying structure 26 are made from rift-sawn or quarter-sawn solid wood. Rift-cut (or rift-sawn) wood is cut along a radius of a log, so that the saw cuts at right angles to the tree's growth ring. Rift-cut wood has a straight grain and good stability properties, but generally produces relatively large amounts of waste during cutting and is thus relatively expensive (and rare). In some embodiments, flat-sawed or quarter-sawn wood may be used for at least some of the wood of panels 22, 24, and keying structure 26. Flat-sawed wood produces less waste during cutting, but is more susceptible to warping and shrinkage. Quarter-sawn wood generally has a cost and stability in-between comparable rift-cut and flat-cut wood.

Figure 4:
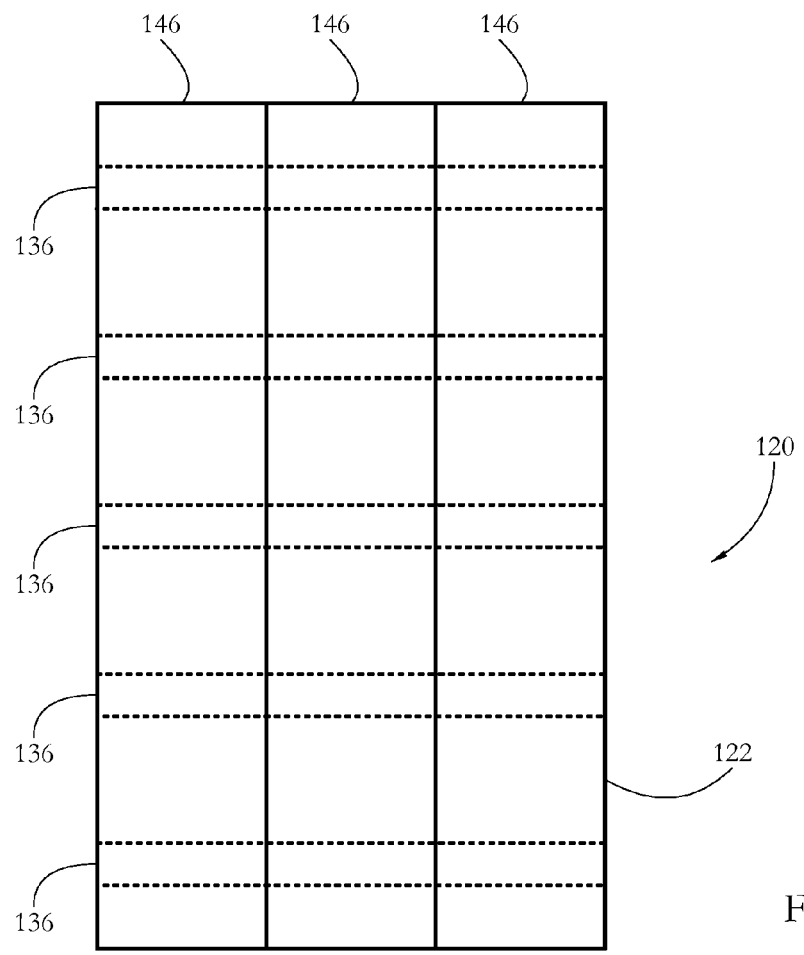
FIG. 4 shows a front view of a generally-planar solid-wood assembly having boards comprising multiple slabs disposed generally-orthogonally relative to a set of sliding-dovetail channels, according to some embodiments of the present invention.

FIG. 4 shows a front view of a generally-planar solid-wood assembly 120 having boards 122 comprising multiple monolithic slabs 146 disposed generally-orthogonally relative to a set of sliding-dovetail channels 136, according to some embodiments of the present invention. A sliding dovetail key extending through a channel 136 extends across multiple slabs 146 (i.e. extends across at least one inter-slab boundary). The interlocking structure formed by the sliding dovetail keys and slabs 146 is thus rigid and stable.

Figure 5:
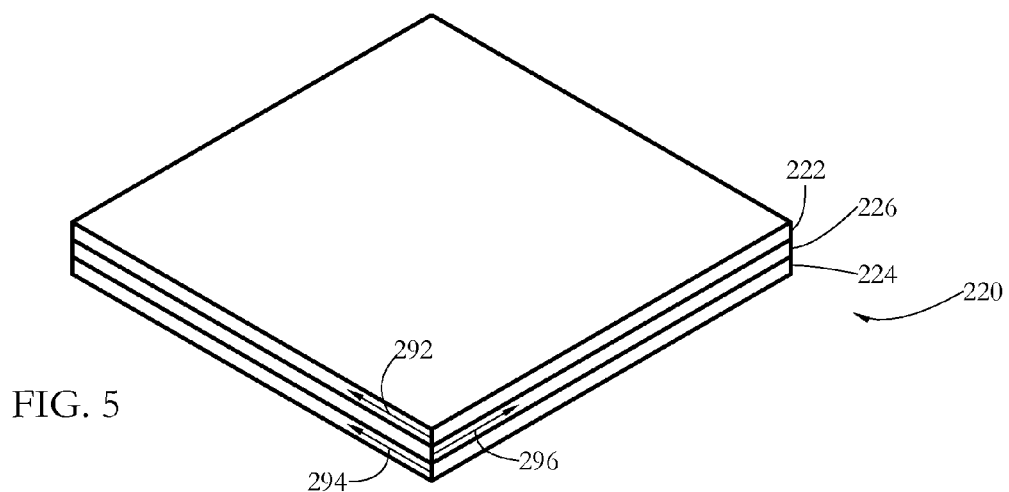
FIG. 5 illustrates a set of wood grain orientations of a multi-layer solid-wood assembly according to some embodiments of the present invention.

FIG. 5 illustrates a set of wood grain orientations of a multi-layer cross-grain solid-wood assembly 220 according to some embodiments of the present invention. A cross-grain arrangement is achieved by orienting the wood grain orientations 292, 294 of external boards 222, 224 to be perpendicular to the wood grain orientation 296 of a sliding dovetail keying structure 226 interconnecting boards 222, 224. In some embodiments, other cross-grain wood grain orientations than the ones illustrated in FIG. 5 may be used. Alternating wood grain orientations in adjacent layers allows reducing the warping and/or stresses that might otherwise occur with single or stacked solid-wood slabs in response to changes in environmental conditions such as temperature and humidity. Warping of one layer along one axis is offset by warping in a cross-grain layer. The resulting perpendicular (as opposed to parallel) strain forces help keep maintain a flat shape for assembly 220. In some embodiments, the dovetail channels 36 (FIGS. 1, 2-B) are cut across the direction of grain, while dovetail keys 30 (FIG. 2-A) are formed so that the dovetail key length coincides with the direction of the wood grain. Then, sliding the dovetail keys into place, which may involve applying high forces to the ends of dovetail keys 30 (e.g. by hammering), involves applying forces along (rather than across) the grain of dovetail keys 30, thus reducing the likelihood of damaging dovetail keys 30 during assembly.

Figure 6:
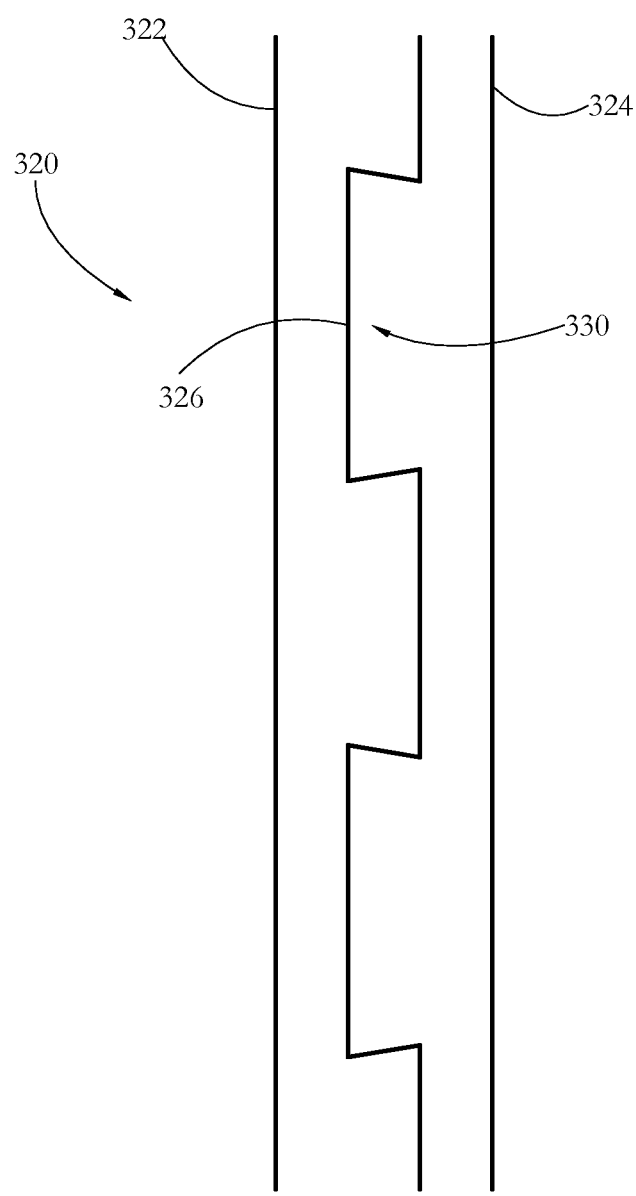
FIG. 6 shows a side view of a generally-planar solid-wood assembly according to some embodiments of the present invention.

FIG. 6 shows a side view of a generally-planar solid-wood assembly 320 according to some embodiments of the present invention. Two cross-grain (or parallel-grain) boards 322, 324 are interlocked by forming matching sliding dovetail channels 326 and dovetail keys 330 opposite each other in the two boards. For a cross-grain assembly, one board has its channels cut along the grain, while the other has its channels/keys defined across the grain. An adhesive is situated along channels 326, to secure boards 322, 324 in a fixed position relative to each other.

Figure 7:
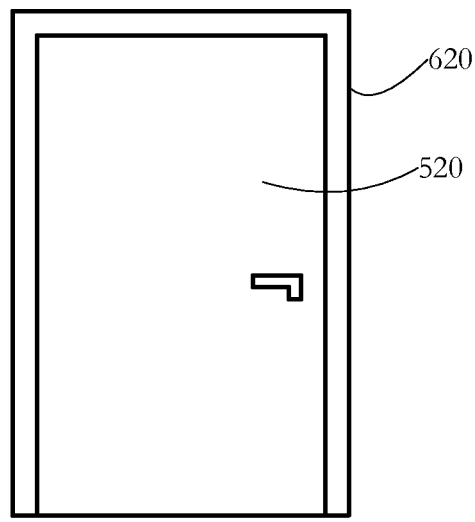
FIG. 7 shows a front view of an exemplary door and door jamb including solid-wood assemblies according to some embodiments of the present invention.

FIG. 7 shows a front view of an exemplary door 520 and door jamb 620 including solid-wood assemblies according to some embodiments of the present invention. Each of door 520 and door jamb 620 comprises an interlocking sliding dovetail assembly as described above, including external boards interconnected by sliding dovetails disposed within channels defined along the internal surfaces of the boards. Door 520 may include components such as a door handle attached to the body of the door. In some embodiments, a three-layer assembly as shown in FIG. 1 may be used for exterior door jambs, while a two-layer structure as shown in FIG. 6 may be used for interior door jambs.

Figure 8:
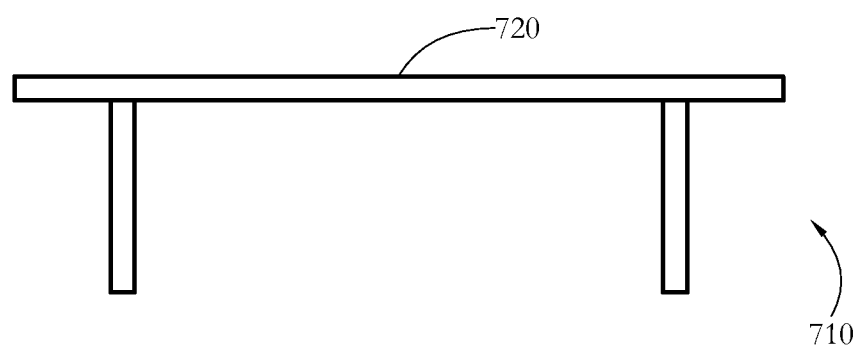
FIG. 8 shows a front view of an exemplary table including a solid-wood tabletop according to some embodiments of the present invention.

FIG. 8 shows an exemplary table 710 including a table top 720. The body of table top 720 may be formed by a solid-wood assembly as described above.

In some embodiments, an assembly such as assembly 20 is made by machining channels 36 out of a solid wood slab using a computer numerical control (CNC) machine, machining dovetail keys 30 out of a solid wood slab using a CNC machine, and sliding dovetail keys 30 within channels 36 to yield an interlocking rigid structure as described above. In some embodiments, the type of vacuum hold commonly used to keep wood structures in place for machining in a conventional CNC machine is not capable of holding relatively-heavy solid-wood slabs. Holes may be drilled at periodic intervals through the solid wood slabs, and the solid wood slabs may be secured with screws during the CNC machining process to ensure that the solid-wood slabs are held securely in a fixed location during the machining process. In some embodiments, a slight taper (conical tolerance) is defined for each sliding dovetail channel along the length of the channel, to facilitate inserting its corresponding sliding dovetail with reduced resistance while locking the sliding dovetail in place at the end of its slide path. The channel is made slightly wider at a proximal (insertion) end and slightly narrower within an inner section and/or at a distal end. After machining and assembly, glue may be used to help secure the various components of assembly 20 in place. During final assembly, wood nails can be inserted through the holes drilled for the screws used during the CNC process, to further stabilize assembly 20 laterally.

The exemplary systems and methods described above allow making durable and solid doors, door jambs, tables, and other solid-wood structures having relatively-large surface areas. Solid wood can be significantly more durable than engineered wood, can be carved, does not chip like veneer, and can have superior aesthetic qualities, particularly in response to aging. At the same time, solid wood products can be significantly more expensive and difficult to manufacture. In particular, making solid-wood products with relatively-large surface areas can be particularly challenging. High warping/stress forces resulting from changes in environmental conditions (e.g. temperature, humidity) can overwhelm conventional fastening mechanisms such as glue and metal fasteners (e.g. screws). Interlocking sliding dovetails as described above allow securing the different assembly layers with sufficient force to withstand environmental stresses. Sliding dovetail connections are normally used for connecting perpendicular structures, rather than solid structures as in the exemplary embodiments described above.

Using a cross-grain layer structure allows reducing the warping of such assemblies. Due to high material costs and relatively slow manufacturing, exemplary assemblies as described above can be significantly more expensive and time-consuming to make than conventional engineered-wood door structures, but can provide superior durability, aesthetics and resistance to mechanical forces. In some embodiments, such structures can be expected to last in excess of a century under normal operating conditions.

The above embodiments may be altered in many ways without departing from the scope of the invention. Accordingly, the scope of the invention should be determined by the following claims and their legal equivalents.

What is claimed is:

1. A solid-wood rigid panel comprising:
   two generally-planar, mutually parallel solid-wood boards each having a plurality of mutually-parallel dovetail-connection channels running generally along an internal major surface of each of the boards; and
   a solid-wood central keying structure disposed between the two mutually-parallel solid-wood boards, the central keying structure comprising a plurality of two-sided sliding dovetail keys sized to slide within the dovetail-connection channels to secure the two mutually-parallel solid-wood boards to each other via sliding dovetail connections to the central keying structure;
   wherein the solid-wood panel forms at least part of a structure selected from a body of a door and a body of a tabletop,
   wherein the dovetail-connection channels are generally perpendicular to a length of the structure,
   wherein a wood grain direction of the central keying structure coincides with a length of the dovetail-connection channels, and
   wherein a wood grain direction of each of the two mutually-parallel solid-wood boards is perpendicular to the length of the dovetail-connection channels.

2. The solid-wood panel of claim 1, wherein the solid-wood panel forms at least part of the body of the door.

3. The solid-wood panel of claim 1, wherein the solid-wood panel assembly forms at least part of the body of the tabletop.

4. The solid-wood panel of claim 1, wherein each the solid-wood boards and sliding dovetail keys are made of rift-sawn or quarter-sawn wood.

5. The solid-wood panel of claim 1, wherein each of the dovetail-connection channels is tapered along a length of the channel, to facilitate a sliding insertion of a dovetail key into the channel.

6. The solid-wood panel of claim 1, wherein the dovetail-connection channels have a depth between ¼" and 1".

7. The solid-wood panel of claim 1, wherein each solid-wood board includes a plurality of laterally-adjacent, monolithic solid-wood slabs, each dovetail-connection channel extending across an interface between adjacent slabs.

8. The solid-wood panel of claim 7, wherein the plurality of sliding dovetail keys extend across interfaces between adjacent slabs.

9. The solid-wood panel of claim 7, wherein the laterally-adjacent solid-wood slabs are interconnected by tongue-and-groove connections.

\* \* \* \* \*